(12) United States Patent
Sauer et al.

(10) Patent No.: US 8,133,467 B2
(45) Date of Patent: *Mar. 13, 2012

(54) PROCESSES FOR CONJOINTLY PRODUCING BROMINE AND CALCIUM CHLORIDE

(75) Inventors: Joe D. Sauer, Baton Rouge, LA (US); George W. Cook, Jr., Baton Rouge, LA (US); Tyson J. Hall, Baton Rouge, LA (US); George A. Newbill, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/523,785

(22) PCT Filed: Feb. 5, 2008

(86) PCT No.: PCT/US2008/053002
§ 371 (c)(1),
(2), (4) Date: Jul. 20, 2009

(87) PCT Pub. No.: WO2008/100736
PCT Pub. Date: Aug. 21, 2008

(65) Prior Publication Data
US 2010/0047155 A1    Feb. 25, 2010

(51) Int. Cl.
*C01B 7/09* (2006.01)
*C01F 11/24* (2006.01)

(52) U.S. Cl. ......... 423/497; 423/500; 423/504; 423/507

(58) Field of Classification Search ............... 423/497, 423/500, 504, 507
See application file for complete search history.

(56) References Cited

U.S. PATENT DOCUMENTS
1,875,070 A    8/1932    Martin et al.
(Continued)

FOREIGN PATENT DOCUMENTS
DE            223429 A  *  6/1985

OTHER PUBLICATIONS
English abstract for DD-223429, Jun. 1985.*
(Continued)

*Primary Examiner* — Ngoc-Yen Nguyen
(74) *Attorney, Agent, or Firm* — Marcy M. Hoefling; Jeremy J. Kliebert; James A. Jubinsky

(57) ABSTRACT

Processes are provided for conjointly producing Br2 and a concentrated aqueous solution containing at least about 5 wt % CaCl2, based on the weight of the concentrated aqueous solution, from an aqueous HBr rich stream and, optionally, a feed brine dilute in CaCl2. Such processes can comprise feeding the aqueous HBr-rich stream and the feed brine to a tower, oxidizing bromide moieties within the tower with Cl2 to produce Br2, recovering Br2 from the tower, removing a bromide-depleted bottoms from the tower, such bottoms containing HCl, adding a Ca++ source to the bromide-depleted bottoms to convert substantially all of the HCl in the bottoms to CaCl2, and, as necessary, removing water from the treated bottoms to produce the concentrated aqueous solution.

1 Claim, 1 Drawing Sheet

U.S. PATENT DOCUMENTS

| | | | |
|---|---|---|---|
| 1,902,801 A * | 3/1933 | Harlow et al. | 423/505 |
| 3,181,934 A | 5/1965 | Davis | |
| 3,523,753 A * | 8/1970 | Jenkner | 423/481 |
| 4,704,265 A | 11/1987 | Krohn et al. | |
| 4,719,096 A | 1/1988 | Lesher et al. | |
| 4,978,518 A | 12/1990 | Lesher et al. | |
| 2002/0076375 A1 | 6/2002 | Rigby et al. | |

OTHER PUBLICATIONS

H.F. Mark, et al; Kirk-Othmer Encyclopedia of Chemical Technology, Edition 3, vol. 4; "Blood, Coagulants & Anticoagulants, to Cardiovascular Agents", 1978, New York, US.

Chemical Abstracts and Indexes, American Chemical Society, Feb. 19, 1990, Columbus, US.

* cited by examiner

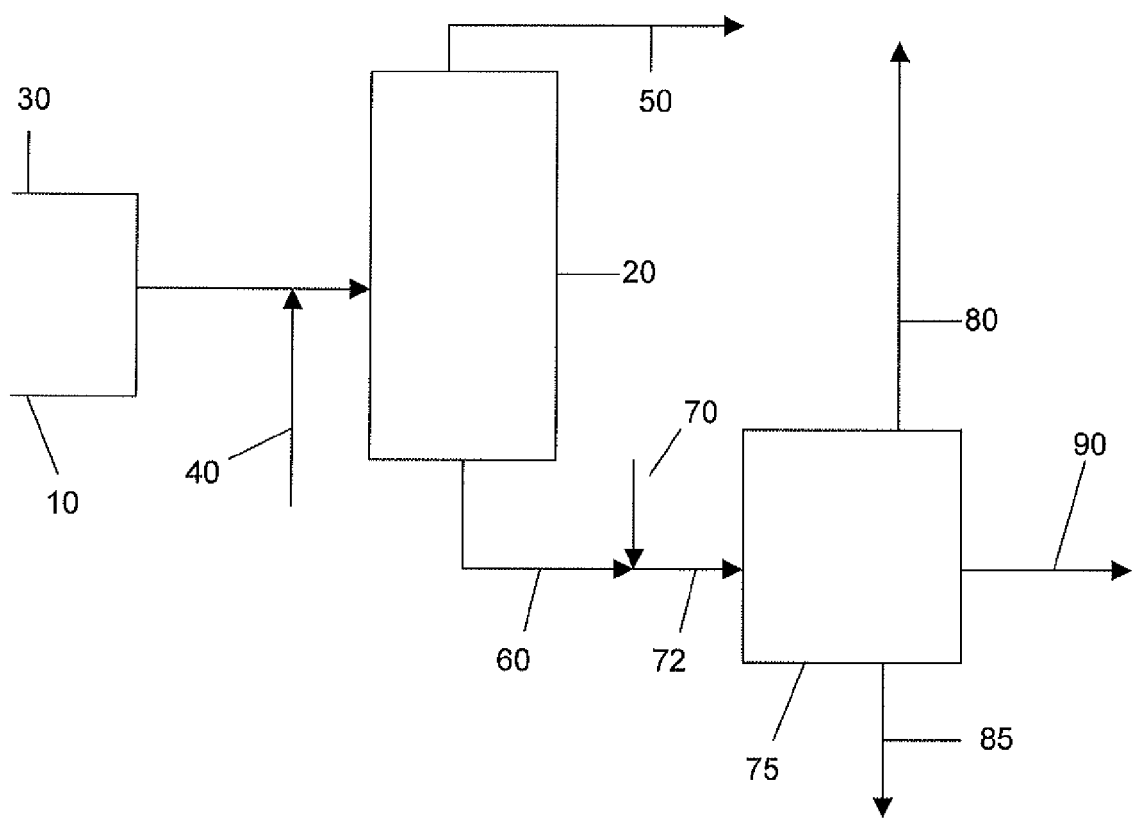

PROCESSES FOR CONJOINTLY PRODUCING BROMINE AND CALCIUM CHLORIDE

BACKGROUND

The present invention relates to processes for conjointly producing bromine and a concentrated aqueous solution of calcium chloride.

Bromine is useful in a wide range of industries. For example, bromine is used in the manufacture of brominated flame retardants such as tetrabromobisphenol, decabromodiphenylethane, decabromodiphenyloxide, and brominated polystyrenes. Bromine is also used, e.g., in the manufacture of 1,2-dibromoethane, which is used as a petrol additive, in the manufacture of compounds used in photography (e.g. silver bromide, which is the light sensitive material in film), in the manufacture of dyestuffs and drugs, in analytical laboratory in testing for unsaturation in organic compounds, as a disinfectant, and in gold extraction. Calcium chloride is also useful in numerous applications, e.g., as a drying agent, in ice and dust control, in oil well drilling, in food processing, in concrete mixtures to speed up setting, as an additive in plastics, and as a drainage aid for wastewater treatment.

One source used in production of bromine and calcium chloride is brine. Brine is an aqueous solution nearly saturated with halide salts and which is produced in several areas of the United States. Such produced brines typically contain at least sodium chloride, sodium bromide and calcium chloride. Additionally, certain processes, such as processes for producing brominated flame retardants, generate substantial quantities of hydrogen bromide as a by-product, which can be converted to bromine.

Processes for production of bromine from these and other bromide-containing solutions are well know. For example, bromine can be produced by a bromine steaming out process, such as Kubierschky's distillation method, see, e.g., Kirk-Othmer, Encyclopedia of Chemical Technology, Fourth Edition, volume 4, pages 548 through 553. Other methods for recovering bromine from bromide-containing solutions are described, e.g., in U.S. Pat. No. 3,181,934, U.S. Pat. No. 4,719,096, U.S. Pat. No. 4,978,518, U.S. Pat. No. 4,725,425, U.S. Pat. No. 5,158,683, and U.S. Pat. No. 5,458,781.

Processes for production of calcium chloride from brines and other sources are also well known. See, e.g., U.S. Pat. No. 4,704,265, WO 03/035550, and U.S. Pat. No. 6,524,546.

Even in view of these and other published methods for production of bromine and for production of calcium chloride, it would be commercially beneficial to have processes for conjointly producing bromine and calcium chloride.

THE INVENTION

This invention meets the above-described needs by providing processes for conjointly producing $Br_2$ and a concentrated aqueous solution comprising from about 5 wt % $CaCl_2$ to about 40 wt % $CaCl_2$, based on the weight of the concentrated aqueous solution, from an aqueous HBr-rich stream and, optionally, a feed brine dilute in $CaCl_2$, which processes comprise: (a) feeding the aqueous HBr-rich stream, and optionally the feed brine, either together or separately to a tower; (b) oxidizing bromide moieties within the tower with $Cl_2$ to produce $Br_2$; (c) recovering $Br_2$ from the tower; (d) removing bromide-depleted bottoms from the tower, such bottoms comprising less than about 35 wt % HCl; (e) adding a $Ca^{++}$ source to the bromide depleted bottoms to convert substantially all of the HCl in the bottoms to $CaCl_2$; and (f) as necessary, removing water from the treated bottoms from (e) to produce the concentrated aqueous solution. Also provided are such processes wherein in (f) heat is used in removing water in from the treated bottoms in the form of steam and the steam is recycled for use in a bromine steaming out process, and/or wherein the aqueous HBr-rich stream comprises amines. Also provided are improvements to processes for producing $Br_2$ from an aqueous HBr-rich stream and, optionally, a feed brine dilute in $CaCl_2$, which processes comprise: (a) feeding the aqueous HBr-rich stream, and optionally the feed brine, either together or separately to a tower, (b) oxidizing bromide moieties within the tower with $Cl_2$ to produce $Br_2$; (c) recovering $Br_2$ from the tower; (d) removing bromide-depleted bottoms from the tower, such bottoms comprising less than about 35 wt % HCl; and (e) adding ammonia or a caustic to the bromide-depleted bottoms to neutralize substantially all of the HCl, the improvement comprising replacing (e) with (f) adding a $Ca^{++}$ source to the bromide depleted bottoms to convert substantially all of the HCl in the bottoms to $CaCl_2$. Also provided are processes for conjointly producing $Br_2$ and a concentrated aqueous solution comprising from about 5 wt % $CaCl_2$ to about 40 wt % $CaCl_2$, based on the weight of the concentrated aqueous solution, which processes comprise: (a) feeding an aqueous HBr-rich stream either together or separately with a feed brine dilute in $CaCl_2$ to a tower, wherein the aqueous HBr-rich stream comprises amines and has a pH of less than about 4 and the feed brine dilute in $CaCl_2$ comprises at least about 10 wt % NaCl, based on the total weight of the feed brine; (b) oxidizing bromide moieties within the tower with $Cl_2$ to produce $Br_2$; (c) recovering $Br_2$ from the tower; (d) removing bromide-depleted bottoms from the tower, such bottoms comprising less than about 5 wt % HCl, based on the weight of the bromide-depleted bottoms; (e) adding a $Ca^{++}$ source to the bromide depleted bottoms to convert substantially all of the HCl in the bottoms to $CaCl_2$; and (f) as necessary, removing water from the treated bottoms from (e) to produce the concentrated aqueous solution.

FIGURES

The invention will be better understood by reference to the FIGURE, which is a flow diagram representative of processes according to this invention.

PROCESS DESCRIPTION

Referring to the FIGURE, in one process according to this invention an aqueous HBr-rich stream 10 is fed to tower 20. Optionally, at least a portion of feed brine stream 30, dilute in $CaCl_2$ is fed to tower 20. Stream 40 comprising source of $Cl_2$ is also fed to tower 20. Streams 10, 40, and optionally 30, can be fed together or separately to tower 20. Inside tower 20, bromide moieties are oxidized with $Cl_2$ to produce $Br_2$ and HCl. Stream 50 comprising produced $Br_2$ is recovered from tower 20. Stream 70 comprising $Ca^{++}$ source is combined with stream 60 comprising bromide-depleted bottoms to convert substantially all of the HCl in the bottoms to $CaCl_2$; i.e., stream 72 comprises $CaCl_2$ and essentially no HCl. As necessary, stream 80 comprising water in the form of steam is removed from the $Ca^{++}$ treated bottoms via device 75 to produce stream 90 comprising a concentrated aqueous solution of at least about 5 wt % $CaCl_2$, based on the weight of the concentrated aqueous solution. Device 75 can be any device suitable for the process, such as a tank, filter, or centrifuge, to name a few.

In another such process according to this invention, stream 80 comprising water in the form of steam is removed from the $Ca^{++}$ treated bottoms via device 75.

In known processes for producing $Br_2$, stream 60 comprising bromide-depleted bottoms can be treated with ammonia or a caustic such as NaOH, MgOH, or the like, to neutralize substantially all of the HCl. In an improvement to such a process according to this invention, stream 70 comprising $Ca^{++}$ source is combined with stream 60 comprising bromide-depleted bottoms to convert substantially all of the HCl in the bottoms to $CaCl_2$. Thus stream 72 comprises $CaCl_2$ and essentially no HCl. This improvement is beneficial in that the cost to treat with a $Ca^{++}$ source is typically less than the cost to treat with ammonia or a caustic, and treatment with a $Ca^{++}$ source produces $CaCl_2$, which can be sold commercially.

In one process according to this invention, aqueous HBr-rich stream 10 that is fed to tower 20 contains amines. The amines can be by-products from other commercial processes and can be available in streams that also contain NaBr. For example, amines in stream 10 can result from production of alkyldimethylamine, which is useful, e.g., in production of quatenary amines, amine oxides, and betaines, which are useful in cleaners, disinfectants, wood treatments, personal care products, oilfield products, and water treatment products. A waste stream from production of alkyldimethylamine can comprise amines and sodium bromide. Bromine in the presence of amine compounds can lead to production of by-products that are shock sensitive. In this process, however, feed brine stream 30 comprises at least about 10 wt % NaCl up to about 25 wt % NaCl (typically about 20 wt % to about 25 wt %) based on the total weight of feed brine stream 30; also, aqueous HBr-rich stream 10 has a pH of less than about 4, or less than about 2, or even less than about zero. The tendency of bromines in solution with amines to produce shock sensitive by-products is significantly reduced in this process due to the combination in tower 20 of stream 30 comprising at least about 10 wt % NaCl and stream 10 having a pH of less than about 4. Thus, bromines and amines in tower 20 do not tend to produce shock-sensitive by-products; and amines can be removed from tower 20 with bromine in stream 50. NaCl from stream 30 can be removed via device 75 via stream 85 comprising NaCl.

Aqueous HBr-Rich Stream

Aqueous HBr-rich stream 10 that is fed to tower 20 comprises at least about 3 wt % HBr, based on the total weight of stream 10, up to the HBr saturation limit of stream 10, e.g., up to about 60 wt % HBr, based on the total weight of stream 10. Stream 10 can also comprise varying amounts of other components such as NaBr. aqueous HBr-rich stream 10 can be produced, e.g., by combining gaseous HBr with a liquid such as water, brine, etc.

Feed Brine Dilute in $CaCl_2$

Feed brine stream 30 dilute in $CaCl_2$ comprises at least about 5 wt % $CaCl_2$ based on the total weight of stream 30. The upper limit of $CaCl_2$ in stream 30 depends upon the feed brine source, and can be based on whatever amount of $CaCl_2$ naturally occurs in the brine, which typically will be no more than about 15 wt % $CaCl_2$ based on the weight of the brine. Stream 30 can also comprise varying amounts of other components such as NaBr and NaCl.

Source of $Cl_2$

Stream 40 comprising source of $Cl_2$ can comprise essentially 100 wt % elemental chlorine, and can also comprise some water, e.g., up to about 5 wt % or more. $Cl_2$ can be purchased from commercial providers or can be produced from, e.g., a feed brine, through electrolysis, as will be familiar to those skilled in the art.

Oxidation of Bromide Moieties with $Cl_2$

As is familiar to those skilled in the art, oxidation of bromide moieties with $Cl_2$ to produce $Br_2$ in tower 20 can occur, e.g., due to the reaction: $2HBr+Cl_2 \rightarrow Br_2+2HCl$ and/or the reaction: $2NaBr+Cl_2 \rightarrow Br_2+2NaCl$, among others. Tower 20 can be any suitable tower for oxidizing bromide moieties with $Cl_2$ to produce $Br_2$, as will be familiar to those skilled in the art. In processes according to this invention, the acidic pH of aqueous HBr-rich stream 10 provides an economic benefit in that the feed brine in stream 30 typically contains impurities such as $NH_3$ and $H_2S$, which react with $Cl_2$. These reactions are inhibited at low pH, e.g., pH less than about 4, thereby improving $Cl_2$ utilization.

Bromide-Depleted Bottoms

Stream 60 comprising bromine-depleted bottoms can comprise water, HCl, NaCl, $CaCl_2$, and other components that result from the oxidation of bromide moieties with $Cl_2$ to produce $Br_2$ and that may pass through tower 20 from stream 10, stream 30, or stream 40 unchanged. Typically, stream 60 comprises essentially no bromide moieties to very small amounts of bromide moieties, e.g., from about 50 ppm to about 400 ppm bromide moieties. Stream 60 comprising bromide-depleted bottoms typically comprises less than about 5 wt % HCl based on the total weight of stream 60, and can comprise 1 wt % HCl to about 5 wt % HCl. In some commercial applications, stream 60 can comprise up to about 35 wt % HCl.

$Ca^{++}$ Source

Stream 70 comprising $Ca^{++}$ source can comprise any suitable source of $Ca^{++}$ that is now known or comes to be known, including without limitation lime, $Ca(OH)_2$, and $CaCO_3$, as will be familiar to those skilled in the art.

Conversion of HCl to $CaCl_2$

Once stream 70 comprising $Ca^{++}$ source is combined with stream 60 comprising bromide-depleted bottoms, $CaCl_2$ can be generated, e.g., by the reaction $2HCl+CaCO_3 \rightarrow CaCl_2+H_2O+CO_2$, and/or the reaction $2HCl+CaO \rightarrow CaCl_2+H_2O$, and/or the reaction $2HCl+Ca(OH)_2 \rightarrow CaCl_2+2H_2O$, among others. Thus stream 72 comprises essentially no HCl, and comprises more $CaCl_2$ and more $H_2O$ than stream 60. Stream 72 can consist essentially of $H_2O$, NaCl and $CaCl_2$.

Removing $H_2O$ from $Ca^{++}$ Treated Bottoms

Stream 80 comprising water that is removed from the $Ca^{++}$ treated bottoms via device 75 comprises primarily water in the form of steam. The water can be removed by heating of the contents of device 75, generally with steam, or via any other heating means, as will familiar to those skilled in the art.

Concentrated Aqueous Solution

Stream 90 comprising a concentrated aqueous solution of at least about 5 wt % $CaCl_2$, based on the weight of the concentrated aqueous solution, can comprise $CaCl_2$ up to the saturation limit of the concentrated aqueous solution. Typically, the concentrated aqueous solution comprises at least about 5 wt % $CaCl_2$, and can comprise from about 5 wt % $CaCl_2$ to about 40 wt % $CaCl_2$. The concentrated aqueous solution can be further processed to produce a substantially 100% composition of $CaCl_2$, which will typically be flaked $CaCl_2$.

EXAMPLE

The following example is illustrative of the principles of this invention. It is understood that this invention is not limited to any one specific embodiment exemplified herein, whether in the examples or the remainder of this patent application.

Referring to the FIGURE, aqueous HBr-rich stream 10 comprises 5838 lbs/hour HBr, 360 lbs/hour NaBr, and 19194 lbs/hour $H_2O$; i.e., stream 10 comprises about 23 wt % HBr, about 1 wt % NaBr, and about 76 wt % $H_2O$, based on the total weight of stream 10. In this example, aqueous HBr-rich stream 10 is comprised of streams from various processes, some of which make brominated flame retardants and some of which comprise amines. Feed brine stream 30 comprises 320 lbs/hour NaBr, 58134 lbs/hour $H_2O$, 22834 lbs/hour NaCl, and 10047 lbs/hour $CaCl_2$; i.e., stream 30 comprises about 0.4 wt % NaBr, about 63.6 wt % $H_2O$, about 25 wt % NaCl, and about 11 wt % $CaCl_2$, based on the total weight of stream 30. Stream 40 comprises at least about 2593 lbs/hour elemental chlorine and only trace amounts of water. Streams 10, 30, and 40 are combined and input to tower 20. Inside tower 20, bromide moieties from streams 10 and 30 are oxidized with $Cl_2$ from stream 40 to produce $Br_2$ in a standard steaming out process, and stream 50 comprising about 5844 lb/hour $Br_2$ is recovered from tower 20. Stream 60 is recovered from tower 20 by means known to those skilled in the art, and comprises 77277 lbs/hour $H_2O$, 2392 lbs/hour HCl, 22834 lbs/hour NaCl, and 10047 lbs/hour $CaCl_2$; i.e., stream 60 comprises about 68.7 wt % $H_2O$, about 2.1 wt % HCl, about 20.3 wt % NaCl, and about 8.9 wt % $CaCl_2$, based on the total weight of stream 60. Stream 70 comprises 3323 lbs/hour $CaCO_3$; i.e., stream 70 comprises 100 wt % $CaCO_3$. Stream 72 results from combination of streams 60 and 70 and the conversion of HCl from stream 60 by $CaCO_3$ from stream 70 to $CaCl_2$ and $H_2O$; and stream 72 comprises 78524 lbs/hour $H_2O$, 22834 lbs/hour NaCl, and 13702 lbs/hour $CaCl_2$; i.e., stream 72 comprises about 68.2 wt % $H_2O$, about 19.9 wt % NaCl, and about 11.9 wt % $CaCl_2$, based on the total weight of stream 72. Stream 72 is input to tank 75, which is heated by steam (heating means not illustrated). NaCl in stream 72 (carried forward from stream 30) is removed from tank 75 via stream 85 comprising 22834 lb/hour NaCl. Stream 80 comprising 57972 lbs/hour $H_2O$, i.e., essentially 100 wt % $H_2O$ based on the weight of stream 80, which $H_2O$ is in the form of steam due to the heating of tank 75 with steam, or alternatively is used to heat tower 20 or tank 75. Calcium chloride (comprising produced $CaCl_2$ and $CaCl_2$ carried forward from stream 30) are recovered from tank 75 via stream 90 which comprises 20552 lbs/hour $H_2O$ and 13702 lbs/hour $CaCl_2$, i.e., about 60 wt % $H_2O$ and about 40 wt % $CaCl_2$, based on the total weight of stream 90. Economic benefit is derived from the sale of stream 90 as is or by sale of flaked $CaCl_2$ from stream 90, produced by means familiar to those skilled in the art.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

While the present invention has been described in terms of one or more preferred embodiments, it is to be understood that other modifications may be made without departing from the scope of the invention, which is set forth in the claims below.

What is claimed is:

1. A process comprising:
   (a) feeding an aqueous HBr-rich stream comprising amine by-products from one or more commercial processes and having a pH of less than about 4, and a feed brine dilute in $CaCl_2$ and comprising at least about 10 wt % NaCl based on the total weight of the feed brine, either together or separately to a tower, such that production of shock-sensitive-by-products in the tower is minimized;
   (b) oxidizing bromide moieties within the tower with $Cl_2$ to produce $Br_2$;
   (c) recovering $Br_2$ from the tower;
   (d) removing bromide-depleted bottoms from the tower, such bottoms comprising less than about 35 wt % HCl;
   (e) adding a $Ca^{++}$ source to the bromide depleted bottoms to convert substantially all of the HCl in the bottoms to $CaCl_2$;
   (f) as necessary, removing water from the treated bottoms from (e) to produce a concentrated aqueous solution comprising from about 5 wt % $CaCl_2$ to about 40 wt % $CaCl_2$; and
   (g) recovering the concentrated aqueous solution comprising from about 5 wt % $CaCl_2$ to about 40 wt % $CaCl_2$.

* * * * *